(12) United States Patent
Lettow et al.

(10) Patent No.: US 12,289,421 B2
(45) Date of Patent: Apr. 29, 2025

(54) COMMUNICATIONS TARPAULIN

(71) Applicant: VORBECK MATERIALS CORP., Jessup, MD (US)

(72) Inventors: John Lettow, Washington, MD (US); Sriram Manivannan, Elkridge, MD (US); James A Turney, Silver Spring, MD (US); Jennifer Pinkos, Hanover, MD (US); Kate Redmond, Baltimore, MD (US); Dan Scheffer, Frederick, MD (US)

(73) Assignee: Vorbeck Materials Corp., Jessup, MD (US)

( * ) Notice: Subject to any disclaimer, the term of this patent is extended or adjusted under 35 U.S.C. 154(b) by 0 days.

(21) Appl. No.: 17/990,444

(22) Filed: Nov. 18, 2022

(65) Prior Publication Data
US 2023/0188634 A1    Jun. 15, 2023

Related U.S. Application Data

(63) Continuation of application No. 17/735,082, filed on May 2, 2022, now abandoned, which is a continuation
(Continued)

(51) Int. Cl.
*H04M 1/05* (2006.01)
*A41D 1/00* (2018.01)
(Continued)

(52) U.S. Cl.
CPC .............. *H04M 1/05* (2013.01); *A41D 1/002* (2013.01); *A41D 31/08* (2019.02); *H01Q 1/273* (2013.01);
(Continued)

(58) Field of Classification Search
CPC ......... H04M 1/05; A41D 1/002; A41D 31/08; H01Q 1/22; H01Q 1/36; H01Q 1/368;
(Continued)

(56) References Cited

U.S. PATENT DOCUMENTS

| | | | |
|---|---|---|---|
| 5,093,929 A * | 3/1992 | Stolarczyk | H04B 5/0081 455/100 |
| 7,658,901 B2 * | 2/2010 | Prud'Homme | H05K 1/095 423/448 |

(Continued)

FOREIGN PATENT DOCUMENTS

WO    WO-2020038552 A1 *    2/2020    ........... D04B 21/165

*Primary Examiner* — Blane J Jackson
(74) *Attorney, Agent, or Firm* — Trent V. Bolar, Esq.; Woods Oviatt Gilman LLP

(57) ABSTRACT

Embodiments of the present invention relate to communications tarpaulins. In one embodiment, the communications tarpaulins include a textile layer, a plurality of antenna elements, and a communications hub. The communications hub includes a plurality of radio frequency ("RF") connectors. The communications hub is affixed to the textile layer. The RF connectors are each conductively coupled to one of the antenna elements. The RF connectors each demountably receive a communications device. The antenna elements are each affixed to the textile layer and includes a conductive composition. The antenna elements each include a conductive composition. The conductive composition includes a polymer and fully exfoliated single sheets of graphene that are present as a three-dimensional percolated network within the polymer. The textile layer includes a first textile layer and a second textile layer that are coterminous and physically coupled together and thereby form a multilayered structure.

5 Claims, 8 Drawing Sheets

Related U.S. Application Data of application No. 17/724,485, filed on Apr. 19, 2022, now abandoned, which is a continuation of application No. 16/925,581, filed on Jul. 10, 2020, now Pat. No. 11,265,410.

(60) Provisional application No. 63/176,443, filed on Apr. 19, 2021, provisional application No. 63/013,599, filed on Apr. 22, 2020.

(51) Int. Cl.

| | | |
|---|---|---|
| *A41D 31/08* | (2019.01) | |
| *H01Q 1/27* | (2006.01) | |
| *H01Q 1/36* | (2006.01) | |
| *H04B 1/3827* | (2015.01) | |
| *H04W 84/04* | (2009.01) | |
| *H04W 84/18* | (2009.01) | |

(52) U.S. Cl.
CPC ............. *H01Q 1/368* (2013.01); *H04B 1/385* (2013.01); *H04B 2001/3855* (2013.01); *H04W 84/04* (2013.01); *H04W 84/18* (2013.01)

(58) Field of Classification Search
CPC . H01Q 1/38; H04B 1/40; H04B 1/385; H04B 2001/3853; H04W 84/04; H04W 84/18
See application file for complete search history.

(56) References Cited

U.S. PATENT DOCUMENTS

| | | | |
|---|---|---|---|
| 8,278,757 B2* | 10/2012 | Crain | H05K 3/0091 |
| | | | 977/734 |
| 10,311,269 B2* | 6/2019 | Pantaloni | G06K 7/10178 |
| 10,601,104 B2* | 3/2020 | Manivannan | H01Q 1/38 |
| 11,265,410 B2* | 3/2022 | Scheffer | A41D 31/08 |
| 2006/0143775 A1* | 7/2006 | Kim | A41D 1/005 |
| | | | 2/102 |
| 2011/0069974 A1* | 3/2011 | Kim | H04B 13/00 |
| | | | 398/200 |
| 2015/0139124 A1* | 5/2015 | Da | H04W 52/244 |
| | | | 370/329 |
| 2017/0105510 A1* | 4/2017 | Tran | A45F 5/02 |
| 2017/0156215 A1* | 6/2017 | Lai | H05K 3/1283 |
| 2018/0109277 A1* | 4/2018 | Ooi | A45F 3/14 |
| 2020/0074253 A1* | 3/2020 | Chang | H01Q 1/368 |
| 2022/0180081 A1* | 6/2022 | Burnside | G06K 19/0723 |

* cited by examiner

COMMUNICATIONS TARPAULIN

CROSS-REFERENCE TO RELATED APPLICATIONS

This application is a continuation of U.S. application Ser. No. 17/735,082 filed May 2, 2022, which is a continuation of U.S. application Ser. No. 17/724,485 filed Apr. 19, 2022, which claims priority to U.S. Provisional Application Ser. No. 63/176,443 filed Apr. 19, 2021, and is a continuation of U.S. patent application Ser. No. 16/925,581 filed Jul. 10, 2020, which claims priority to U.S. Provisional Application Ser. No. 63/013,599 filed Apr. 22, 2020. Each of the foregoing applications are hereby incorporated herein by reference.

TECHNICAL FIELD

Background

The instant disclosure relates generally to tarpaulins and specifically to communications tarpaulins. Tarpaulins are large sheets of strong and flexible textiles (e.g., woven or non-woven) that may be water-resistant or waterproof. Tarpaulins can be tied down or suspended for use. Tarpaulins can be used in a variety of ways to protect persons and things from rain, sleet, snow, sunlight, and wind. For example, tarpaulins can be used to protect partially built or damaged structures as well as to form temporary structures (e.g., tents and other temporary structures). Electronic communication plays an important role in modern business and society. One cannot think of passing modern life and managing modern businesses without electronic communication. It allows the amalgamation of several media, such as data, graphics, video, and sound, into one message. Even more, antenna masts have a large identifiable visual signature which serves as an easily identifiable location marker for the structure to which it is attached. There exists a need in the art for tarpaulins that include reduced visual signatures antenna elements to assist in electronic communications.

DETAILED DESCRIPTION

Figure 1:
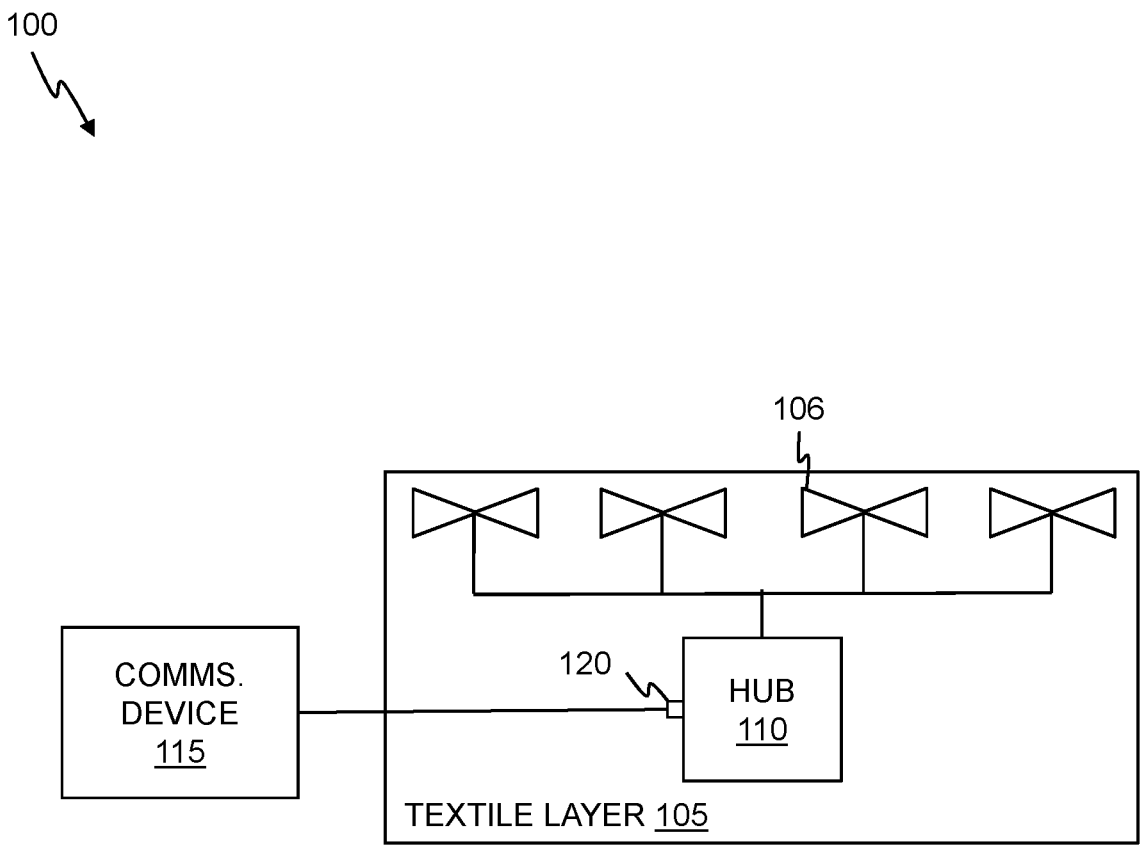
FIG. 1 depicts a block diagram of a communications tarpaulin communicatively coupled to a communications device, in accordance with some embodiments.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

The instant disclosure relates generally to tarpaulins and specifically to communications tarpaulins. Tarpaulins are large sheets of strong and flexible textiles (e.g., woven or non-woven) that may be water-resistant or waterproof. Tarpaulins can be tied down or suspended for use. Tarpaulins can be used in a variety of ways to protect persons and things from rain, sleet, snow, sunlight, and wind. For example, tarpaulins can be used to protect partially built or damaged structures as well as to form temporary structures (e.g., tents and other temporary structures). Electronic communication plays an important role in modern business and society. One cannot think of passing modern life and managing modern businesses without electronic communication. It allows the amalgamation of several media, such as data, graphics, video, and sound, into one message. Even more, antenna masts have a large identifiable visual signature that serve as an easily identifiable location marker for the structure to which it is attached. There exists a need in the art for a planar, flexible antenna mast that has a reduced visual signature to assist in electronic communications.

Embodiments of the instant disclosure seek to provide a tarpaulin that includes an embedded antenna system (hereinafter "communications tarpaulin"). In some embodiments, the instant disclosure seeks to provide communications tarpaulins can be used to protect persons and/or objects. Other aspects of the instant disclosure seek to provide communications tarpaulins that can communicatively couple to communications systems as well as other devices that are capable of radio communications. Additional aspects of the instant disclosure seek to provide communications tarpaulins that include flexible and planar antenna elements that allow the communications tarpaulin to be rolled-up and/or folded without a statistically significant reduction in performance of the included antenna elements. The instant disclosure further seeks to provide communications tarpaulins that are configured to conform to the shape of the structure it is attached to and thereby reduce the identifiable visual signature thereof.

Turning now to the FIGS. FIG. 1 depicts a block diagram of a communications tarpaulin, generally 100, conductively coupled to a communications device 115, in accordance with some embodiments. The communications device 115 is a computing device that can send and/or receive information using radio communications. The communications device 115 can be a hand-held radio transceiver (e.g., walkie-talkie), communications system, a transceiver, or similar computing devices that can send and/or receive radio transmissions. The communications device 115 can include a plurality of computing devices that work together as a single system (i.e. a cluster computer) to perform at least one communications function.

Figure 2:
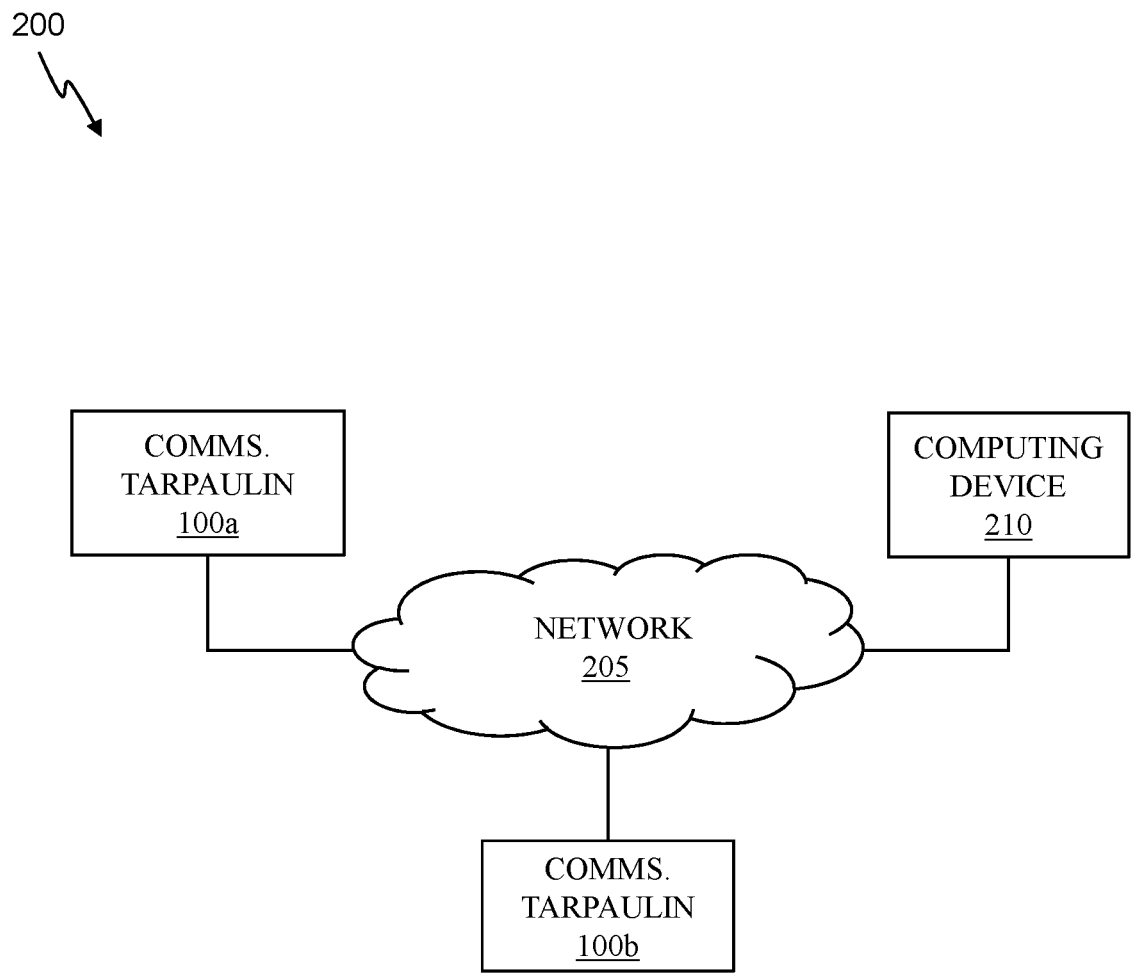
FIG. 2 depicts a block diagram of a communications environment for the communications tarpaulin, in accordance with other embodiments.

To utilize the communications tarpaulin 100 to communicate with other copies of the communications tarpaulin 100 and/or a computing device 210 via a network 205 (as shown in FIG. 2), users communicatively couple the communications device 115 to the communications tarpaulin 100. The computing device 210 can be a laptop computer, tablet computer, netbook computer, personal computer (PC), a desktop computer, a personal digital assistant (PDA), a smart phone, or any programmable electronic device capable of communicating with the communications tarpaulin 100 and/or other computing devices via network 210. The network 205 can be, for example, a local area network (LAN), a wide area network (WAN) such as the Internet, or a combination of the two, and can include wired, wireless, or fiber optic connections. In general, network 205 can be any combination of connections and protocols that will support communications between the communications tarpaulin 100a and other devices (e.g., a communications tarpaulin 100b and/or a computing device 210).

The communications tarpaulin 100 is a textile-based apparatus that includes a plurality of antenna elements 106 that are each conductively coupled to a radio frequency (hereinafter "RF") connector 120 that is included in a communications hub 110. The RF connector 120 can be a standard RF connector known in the art (e.g., SMA, RP-SMA, TNC, RP-TNC, Type-N, BNC, and similar RF connectors). Each RF connector 120 demountably receives a communications device 115. The antenna elements 106 and the communications hub 110 are affixed to a textile layer 105. The textile layer 105 is a large sheet of strong, flexible, water-resistant/waterproof textile material that can be woven or non-woven, natural or synthetic (e.g., a polymer(s)), mold and/or UV resistant, heat resistant up to 360°-390° F., single-layered or multi-layered, or a combination of two or more thereof. In preferred embodiments, the textile layer 105 has a tear strength and a tensile strength of at least 300 lbs. (warp), 225 lbs. (fill), as measured through ASTM D5034-21.

Applicable textiles include, but are not limited to, nylon-based textiles, denier-based textiles, polyester-based textiles, biaxially-oriented polyethylene terephthalate-based textiles, cotton-based textiles, other polymer-based textiles, or a combination of two or more thereof. Applicable textiles include, but are not limited to, woven and/or non-woven textiles that are coated and/or treated with a water repellant and/or flame retardant. The textile layer can be prepared using a variety of methods known in the art (e.g., spraying, coating, as well as similar application methods). For example, when the fabric is hydrophilic, a water based flame retardant solution known in the art can be applied (e.g., via spray or coating) first to increase its absorption followed by treatment with a water repellent hydrophilic solution known in the art. In other embodiments, a coating solution that includes both water repellent and flame retardant materials can be used as over coating on the textile fabric. To be sure, the textile layer 105 can be any color, shape (e.g., rectangle, oval, square, etc.), and/or size that can facilitate one or more embodiments of the instant disclosure.

Figure 4:
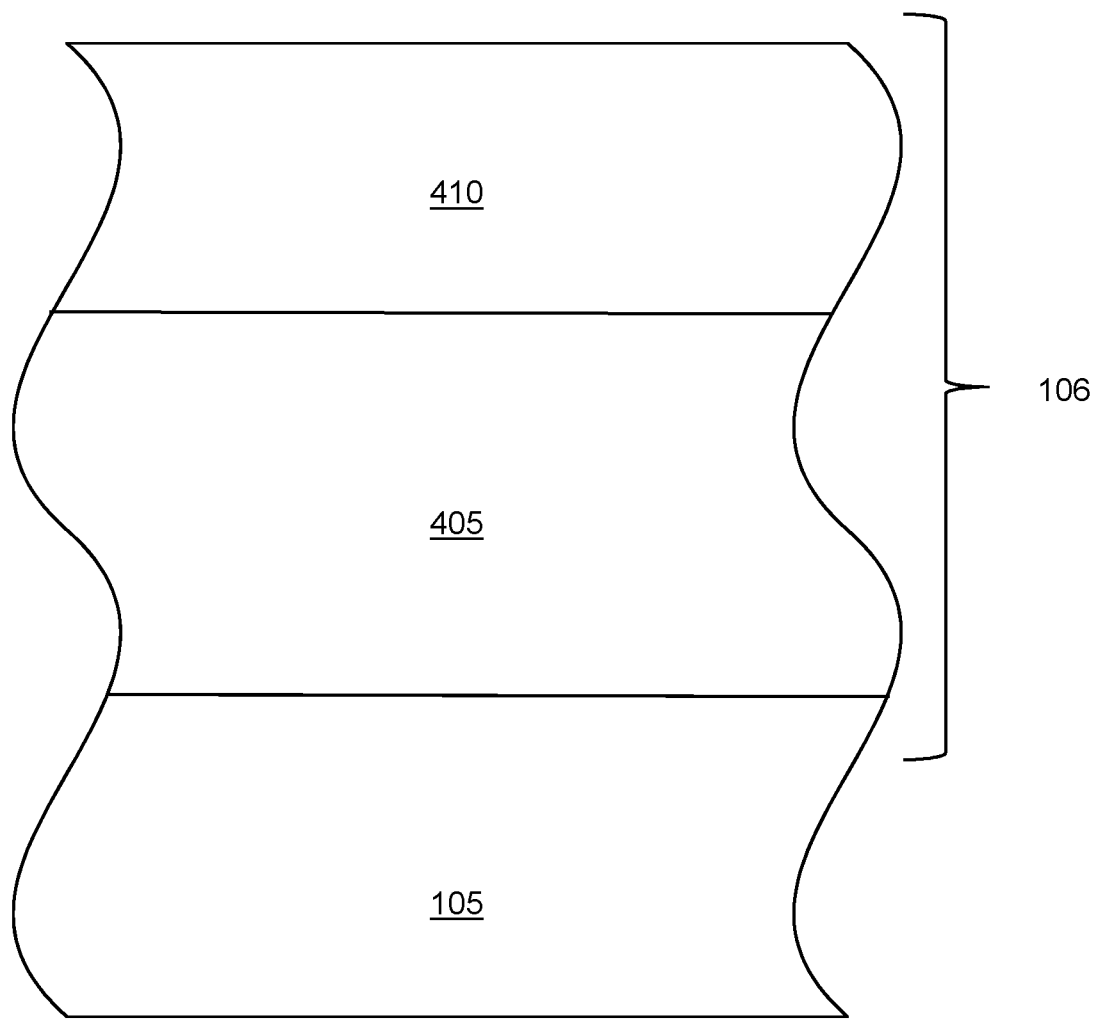
FIG. 4 illustrates a cross-section of an antenna element that includes a conductive composition affixed to a substrate, in accordance with yet still other embodiments.

The antenna elements 106 can be formed on the textile layer 105 or on a substrate and subsequently affixed to the textile layer 105. As reflected in FIG. 4, the antenna element 106 includes a conductive component 410 affixed to a substrate 405 (e.g., polyethylene terephthalate or "PET") where the completed antenna element 106 is subsequently affixed to the textile layer 105, according to certain embodiments. To increase antenna performance, the EM radiation that emanates from the antenna element 106 should be directed away from the structure to which the communications tarpaulin 100 is attached. EMI shielding can be utilized for this purpose. In certain embodiments, the substrate 405 includes EMI shielding material (discussed below) to reflect EM radiation that emanates from the antenna element 106 away from structure to which the communications tarpaulin 100 is attached.

Antenna elements 106 are preferably made with a graphene and polymer-based conductive composition (hereinafter "conductive composition"). In some embodiments, the conductive composition does not include metals (i.e. is non-metallic), which reduces the likelihood of the communications tarpaulin 100 experiencing corrosive events. In preferred embodiments, the antenna elements 106 are screen printed on substrates (e.g., PET and similar polymeric materials) using the conductive composition and subsequently cured.

Alternatively, other printing method can be used, such as thermal transfer (including laser transfer) printing, doctor blade printing, rotary screen printing, gravure printing, lithographic printing, intaglio printing, digital printing, capillary printing, offset printing, electrohydrodynamic printing (as described in U.S. Pat. No. 8,906,285, issued Dec. 9, 2014; which is hereby incorporated herein by reference in its entirety), microprinting, pad printing, tampon printing, stencil printing, wire rod coating, drawing, flexographic printing, stamping, xerography, microcontact printing, dip pen nanolithography, laser printing, via pen or similar means, etc. In other embodiments, the antenna elements 106 can also be formed using a molding technique and subsequently affixed to the substrate 405 or the textile layer 105.

The conductive composition includes individual fully exfoliated sheets of graphene ("graphene sheets") that are thoroughly mixed and disbursed throughout the polymer matrix to thereby form a three-dimensional percolated network therein. The conductive composition can be formed using various curing agents, curing temperatures, and/or curing times. Although various definitions of graphene exist, as used herein, the term "graphene sheets" refers to sheets of hexagonally arranged carbon atoms that are approximately 1 nm or less thick and have a "platey" (e.g., two-dimensional) honeycomb lattice nanostructure.

To be sure, graphene is electrically, mechanically, structurally and chemically unique compared to both graphite (a multi-layered structure) and carbon nanotubes (a hollow cylindrical structure). For example, graphene is a zero-gap semiconductor that exhibits the anomalous quantum Hall effect while carbon nanotubes, depending on their structure, can be either semiconducting, with a variable bandgap, or metallic. In some embodiments, the substrate includes insulating material(s). In other embodiments, the substrate 405 is affixed to insulating material(s) whereby the antenna element 106 is positioned on the substrate 405 opposite the insulating material. For example, applicable insulating materials include, but are not limited to, dielectrics, paper, polytetrafluoroethylene, polymers, or a combination of two or more thereof. Not to be limited by theory, in traditional metal-based antenna systems, insulating separator layers typically have a thickness (t) as defined below in Equation [1]:

$$t = \tfrac{1}{2}\lambda; \text{ where } \lambda \text{ is the intended frequency of the antenna} \quad \text{Eq. [1]}$$

In several embodiments, contrary to metal-based antenna systems, the antenna elements have a thickness (t2) as defined in Equation [2]:

$$t2 = \tfrac{1}{2}\lambda; \text{ where } \lambda \text{ is the intended frequency of the antenna} \quad \text{Eq. [2]}$$

In certain embodiments, the antennas elements 106 formed using the conductive composition exhibit primary antenna function on their surface as well as exhibit insulating characteristics correlated to its thickness when in contact with conductive surfaces. Not to be limited by theory, conductive elements formed using the conductive composition can exhibit attenuating permeation that may result in a variable induced charge density as the wave/signal permeates through the antenna. For example, the charge density at any Gaussian plane in the conductive composition is equal to the strength of the electric field after moving any given distance through the material with a particular permittivity.

This phenomenon typically leads to an increased charge density at the point of incidence on the surface and a decrease in charge density as the signal travels through, and is attenuated by, the conductive composition, which can result in the antenna element exhibiting primary antenna function on its surface while providing insulation that is correlated with its thickness when in contact with the conductive surface. On the contrary, traditional metal-based antennas have free electrons to distribute charge and create an affective permittivity of infinity and thereby are unable to achieve attenuating permeation.

Electrically conductive surfaces can reflect EM waves; hence, in metal-based antennas the wave typically traverses the correct distance so that the reflected wave's amplitude (denoting signal strength) does not cancel out the original wave's amplitude, which is the case with materials that fail to attenuate EM waves. In contrast, since the antenna elements 106 are formed using the conductive composition, EM waves are weakened as they travel through the conductive composition. Hence, as waves reflect off the metal/conductive surface and arrives back to the functioning surface of the conductive element the signal strength or amplitude of the reflected EM wave can be lowered and, at times, out of harmony, fail to cancel out the signal, thus reducing destructive interference.

The conductive composition preferably includes one or more polymers and fully exfoliated single sheets of graphene that form a three dimensional percolated network within the polymer matrix and have nanoscale separation between the individual graphene sheets. However, in other embodiments, the conductive composition contains metals (e.g., silver, copper, gold, nickel, other metals, alloys, or a combination of two or more thereof).

Increases in the resistance of the conductive composition results in a decrease in the performance efficiency of the antenna elements 106. As used herein, "antenna efficiency" is defined as the ratio of power delivered to antenna elements 106 versus the power radiated therefrom. Here, an increase in electrical resistance decreases the amount of power available for radiation, which thereby decreases the antenna element 106 performance efficiency. To be sure, the communications tarpaulin 100 can include any number of antenna elements 106 to facilitate one or more embodiments of the instant disclosure.

In preferred embodiments, the antenna elements 106 are screen printed using the conductive composition on polymer sheets (e.g., PET) that are 5 millimeters thick. To be sure, 5 millimeters is the minimum thickness of various polymer substrates that will not warp when exposed to applicable curing temperatures for the conductive composition. Warping of the antenna element 106 typically results in a reduction in antenna efficiency. In certain embodiments, an antenna element 106 has a conductivity of 0.2-1.5 Ohms/sq. The antenna elements 106 are preferably cured subsequent to formation (i.e. printing, molding, other applicable manufacturing techniques). Each antenna element 106 can be configured to be a single band or multiband antenna.

In yet still other embodiments, the antenna element 106 is an antenna array. For example, use of such antenna arrays could provide the computing device 115 with a statistical increase in gain, directionality, and circular polarization compared to single antenna usage. Such antenna arrays include a variety of antenna types, including, but not limited to, dipole antennas, patch antennas or other planar antenna element designs suitable for use in antenna arrays. Such antenna arrays are preferably configured to include a single connection conductively coupled to transmission line such that power input from transmission line to the antenna array is split to the antenna elements of the array. Alternatively, such antenna arrays may be configured to include multiple connections conductively coupled to multiple transmission lines.

Figure 3:
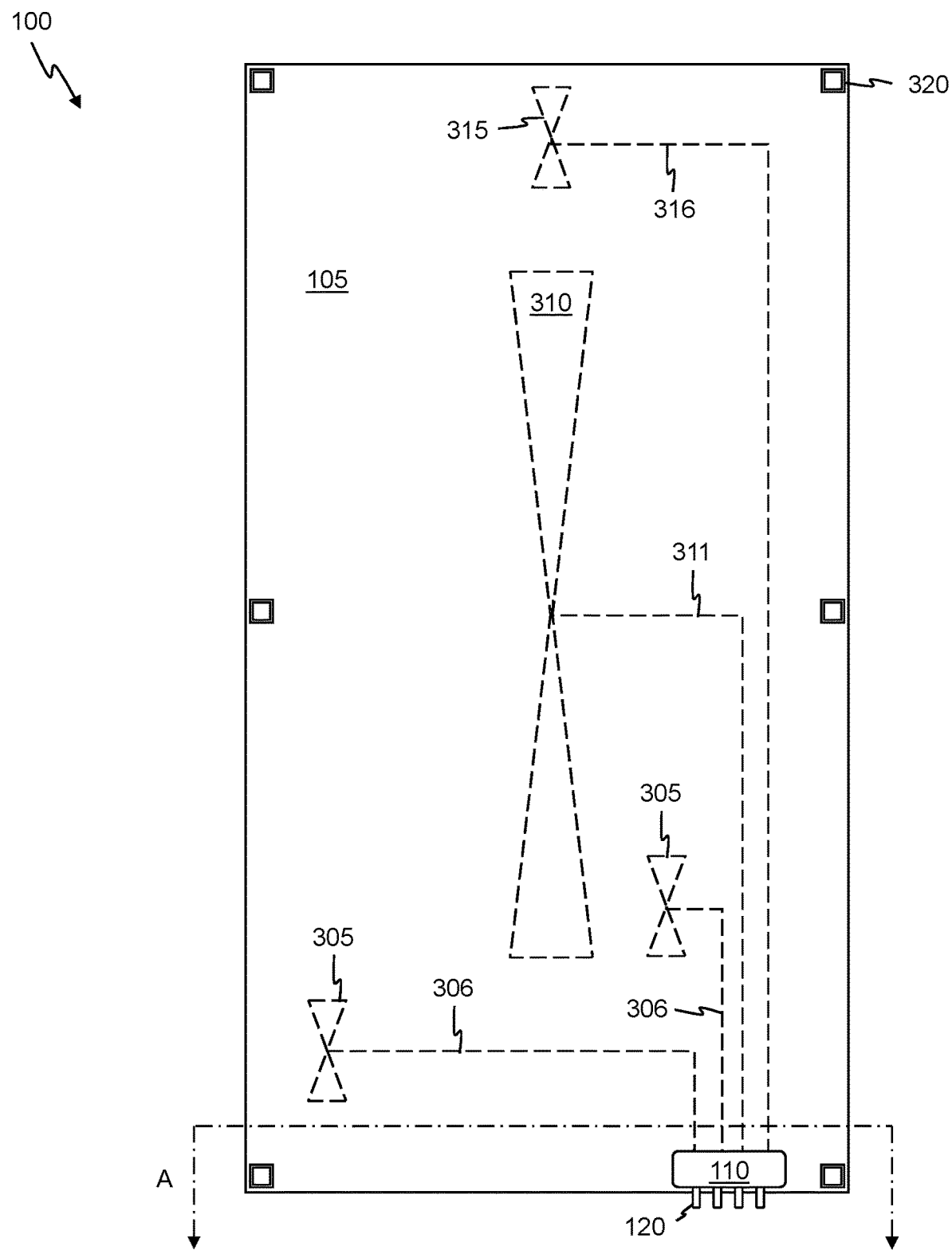
FIG. 3 illustrates the placement of antenna elements of the communications tarpaulin, in accordance with certain embodiments.

Turning now to the placement and positioning of antenna elements 106 on the textile layer 105, which plays a key role in the communication performance of the communications tarpaulin 100. FIG. 3 illustrates the placement of antenna elements 106 on the communications tarpaulin 100, in accordance with certain embodiments. Here, antenna elements 305, an antenna element 315, and an antenna element 310 each represent different types of the antenna element 106 that each have unique operating frequencies. The antenna elements 305, an antenna element 315, and an antenna element 310 are each conductively coupled to the communications hub 110 via a cable 306, a cable 316, and a cable 311, respectively. To be sure, the antenna elements 106 should be strategically positioned to optimize their performance characteristics. For example, the antenna elements 106 are positioned on the textile layer 105 with the lowest frequency antenna elements 106 positioned in the center of the textile layer 105 (i.e. the antenna element 310). The antenna elements 305 and the antenna element 315 are positioned at least a half a wavelength from the lowest frequency antenna elements 106 (i.e. the antenna element 310) positioned in the center of the textile layer 105 (i.e. the antenna element 310).

Coaxial cables (e.g., the cable 306, a cable 311, and a cable 316) connect the antenna elements 305, 310, and 315 to the RF connectors 120 and are preferably "tacked" in place, for example, through stitching loops around the cable and binding (e.g., via polymeric adhesive) to the textile layer 105 to keep them from shifting during use. The cables are routed within or on the textile layer 105 to minimize cable length and avoid overlap. Even more, minimizing cable length is vital to minimize loss in the performance of the antenna elements 106. Attenuation due to cable length is typically a property of cable type and frequency. For example, LMR-100A cable has loss of 39.8 dB/100 ft. at 2500 MHz and 64.1 dB/100 ft. at 5800 MHz. Thus, higher frequency antennas (e.g., the antenna elements 305) are positioned close to the communications hub 110 to minimize cable lengths (i.e. minimize attenuation) and optimize antenna performance.

Figure 5:
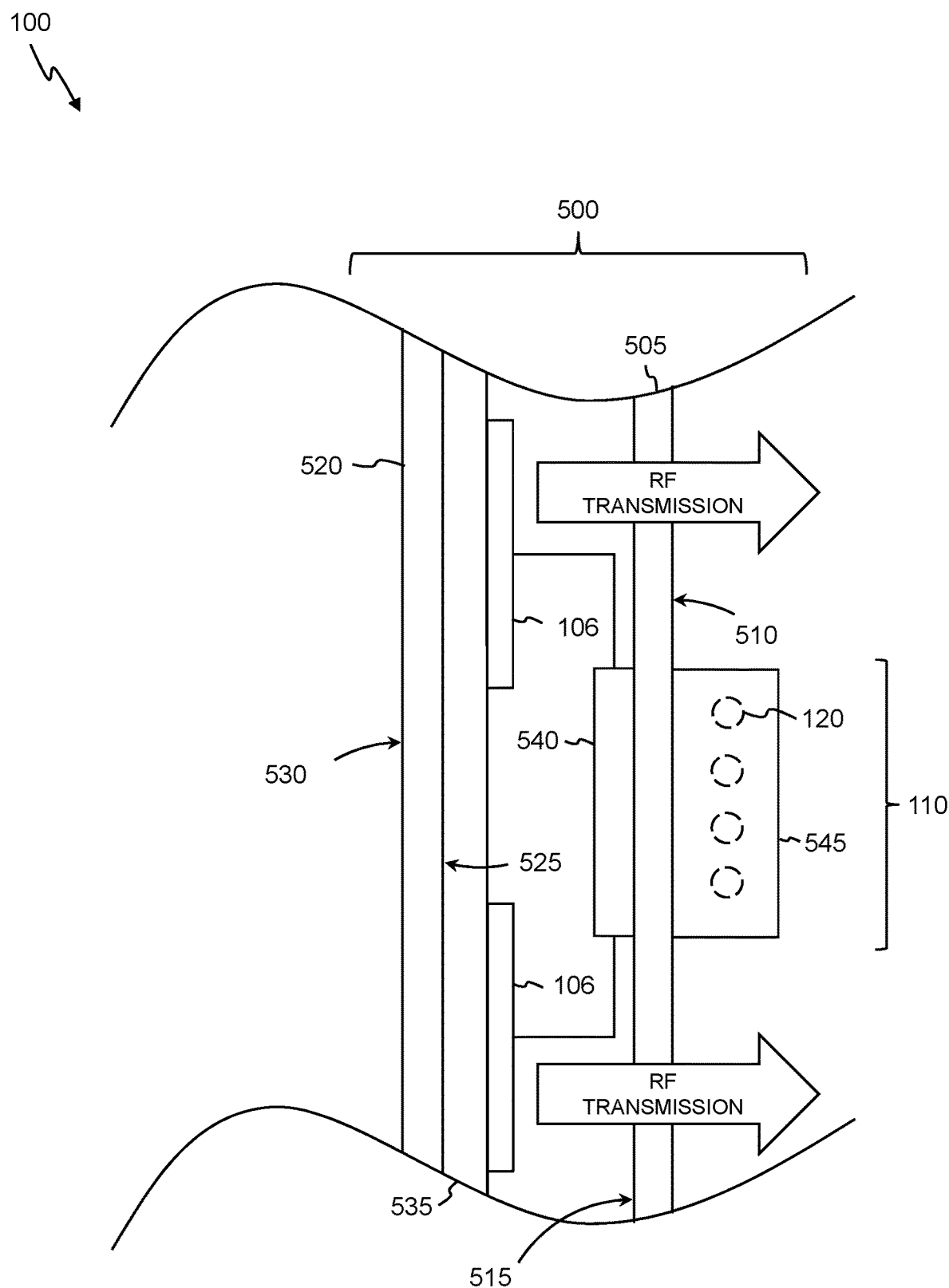
FIG. 5 illustrates View A of FIG. 3, which is a cross-section of the communications tarpaulin, in accordance with some embodiments.

FIG. 5 illustrates View A of FIG. 3, which is a cross-section of the communications tarpaulin 100, in accordance with some embodiments. Specifically, FIG. 5 depicts a multi-layered version of the communications tarpaulin 100 where the textile layer 105 is a multi-layered structure 500 that includes the antenna elements 106 and an EMI shielding layer 535 positioned between a first textile layer 505 and a second textile layer 520. The EMI shielding layer 535 includes EMI shielding material (discussed below).

The first textile layer 505 and a second textile layer 520 are coterminous and physically coupled together (e.g., via stitching, stapling, adhesives, as well as other permanent affixing solutions) to thereby form the multilayered structure 500. The antenna elements 106 are positioned within the multilayered structure 500. Specifically, the first textile layer 505 has a first external surface 510 and an opposing first internal surface 515. The second textile layer 520 has a second external surface 530 and an opposing second internal surface 525.

The communications hub 110 can include a front plate 545, which includes the RF connectors 120, and a back plate 540, which are externally and internally positioned on the multilayered structure 500, respectively. Specifically, the front plate 545 is affixed to first external surface 510 (e.g., using an adhesive to form an airtight seal between the two components) and the back plate 540 is affixed to first internal surface 515 (e.g., using an adhesive to form an airtight seal between the two components); hence, the front plate 545 is externally positioned on the multilayered structure 500 and the back plate 540 is internally positioned on the multilayered structure 500. The front plate 545 and the back plate 540 can be further affixed together using fasteners (e.g., screws). Each antenna element 106 is positioned on the EMI shielding layer 535, which is positioned on the second internal surface 515. As RF transmissions emanate from the antenna element 106 those that travel towards the second textile layer 520 are reflected via the EMI shielding layer 535 towards the first textile layer 505.

The EMI shielding layer 535 and the substrate 405 (when EMI shielding material is present) can be single-layered or multi-layered structures (i.e. one or more layers that include EMI shielding material). In certain embodiments, the EMI shielding material is applied via spraying, coating, and/or molding (i.e. preformed and subsequently applied). The EMI shielding layer 535 may be present across the entire surface of the second internal surface 530, or there may be gaps, such as locations on the second textile layer 520 where the antenna elements 106 are placed. Here, each antenna element 106 preferably includes an EMI shielding substrate 405 (see the FIG. 4 discussion).

Applicable EMI shielding materials includes one or more electrically conductive materials that include, but are not limited to, conductive coatings, meshes, fabrics, and films. Such fabrics, meshes, and films can be woven or non-woven. The conductive materials further include, but are not limited to, carbon-based materials such as graphene, carbon fibers, carbon veils, metals (such as one or more of copper, nickel, aluminum, steel, silver, etc.).

Examples of conductive coatings include those based on carbon, such as graphene, graphite, carbon fibers, and/or carbon black, and those based on metals, such as silver, copper, etc. In some embodiments, the shielding layers and components include two or more layers that each include different materials. Examples include layers that include a conductive coating (such as a coating based on carbon and/or a metal and a metallic mesh, fabric, or film).

In some cases, the EMI shielding layers and/or components provide a shielding effectiveness of at least about 30 dB, or of at least about 40 dB, or of at least about 50 dB, or of at least about 60 dB, or of at least about 70 dB, or of at least about 80 dB, or of at least about 90 dB, or of at least about 100 dB at the frequencies of interest. Frequencies of interest can include one or more of about 100 MHz to about 500 MHz, about 500 MHz to about 1 GHz, about 1 GHz to about 6 GHz, about 6 GHz to about 8 GHz, about 8 GHz to about 18 GHz, about 18 GHz to about 20 GHz, and/or about 20 GHz to about 26 GHz.

The EMI shielding layers and/or components can be incorporated into the communications tarpaulin 100 by coating one or more surfaces thereof with a conductive coating (e.g., the conductive composition discussed above or similar polymer-based compositions that includes conductive material). In other embodiments, the EMI shielding layer 535 is a film or fabric that is coated with a conductive coating and attached to the first textile layer 505 or the second textile layer 520 by any suitable means, such as using an adhesive or sewing. The EMI shielding layer 535 should have voids or spaces to account for the position of the antenna elements 106 when affixed to the first textile layer 505.

In one embodiment, the EMI shielding layer 535 is one or more polymeric films or fabrics that is coated with a graphene-based polymeric coating to a thickness of about 30 to about 40 µm and a surface resistivity of about 1.5 to about 3 ohms/sq. Chamber tests show that such the coatings have a shielding effectiveness of about 40 to about 50 dB in the range of 4 to 6 GHz.

Figure 6:
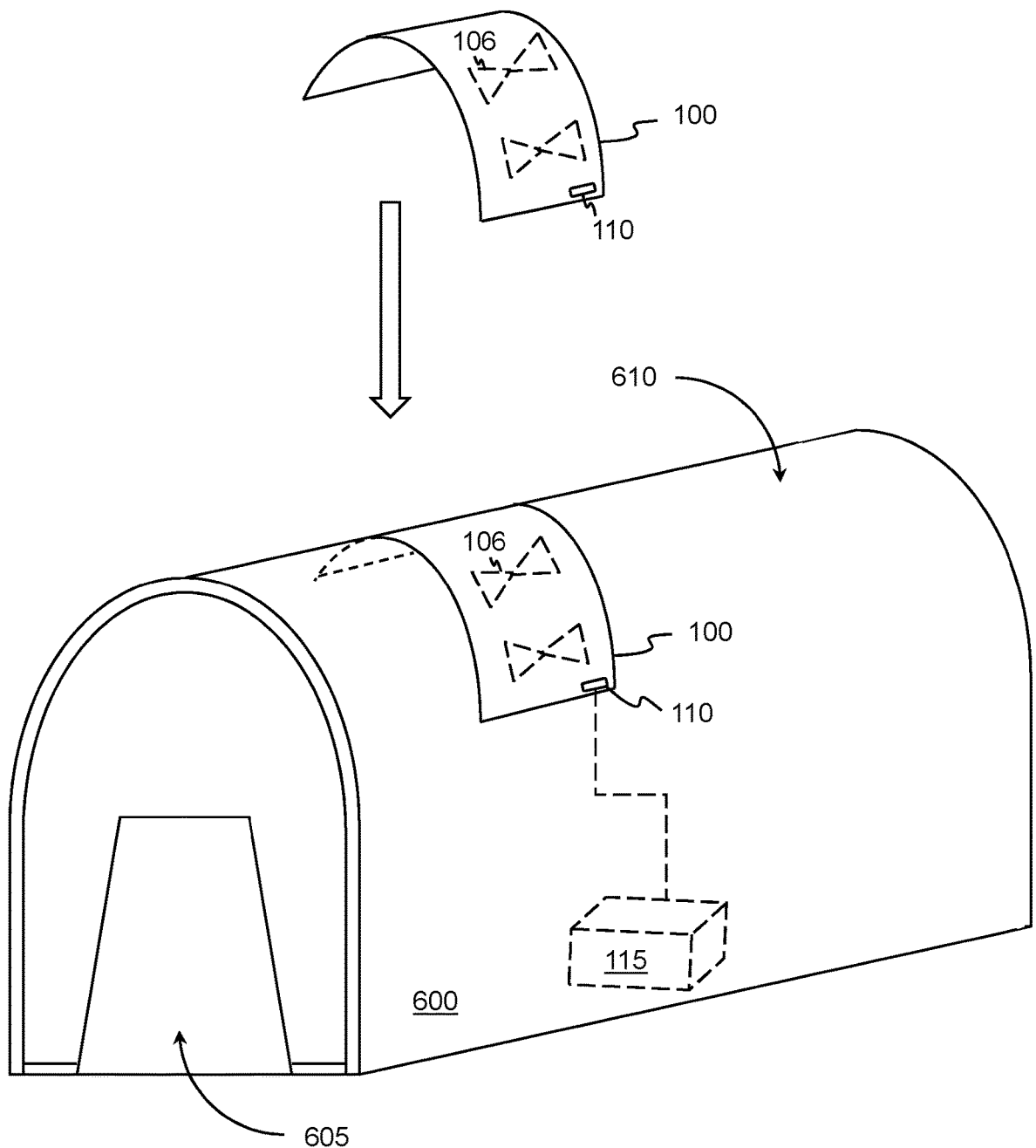
FIG. 6 illustrates a perspective view of how the communications tarpaulin is positioned on a structure and communicatively coupled to a communications device, in accordance with other embodiments.

FIG. 6 illustrates a perspective view of how the communications tarpaulin 100 is positioned on a portable structure 600 and communicatively coupled to the communications device 115, in accordance with other embodiments. The portable structure 600 is a temporary shelter known in the art that includes sheets of fabric or other material draped over, attached to a frame (e.g., of poles or other frame components) or attached to a support (e.g., supporting structure such as rope or similar support entities). The portable structure 600 includes an entrance 605 positioned at an end thereof and an external surface 610. The communications tarpaulin 100 can be affixed to the external surface 610 of the portable structure 600 via attachment points 320, which are peripherally positioned along the communications tarpaulin 100. The attachment points 320 can be structures that demountably receive fasteners, cables, and/or ropes or can be demountable fasteners themselves.

Alternatively, the attachment points 320 can reinforced holes, voids, apertures, openings, spaces, gaps, slots, passages, etc. Although the portable structure 600 is depicted, the communications tarpaulin 100 can be affixed to other types of structures including, but not limited to, vehicles, aquatic platforms, aerial platforms, residential structures, commercial structures, posts, poles (e.g., flag poles), etc.

Figure 7:
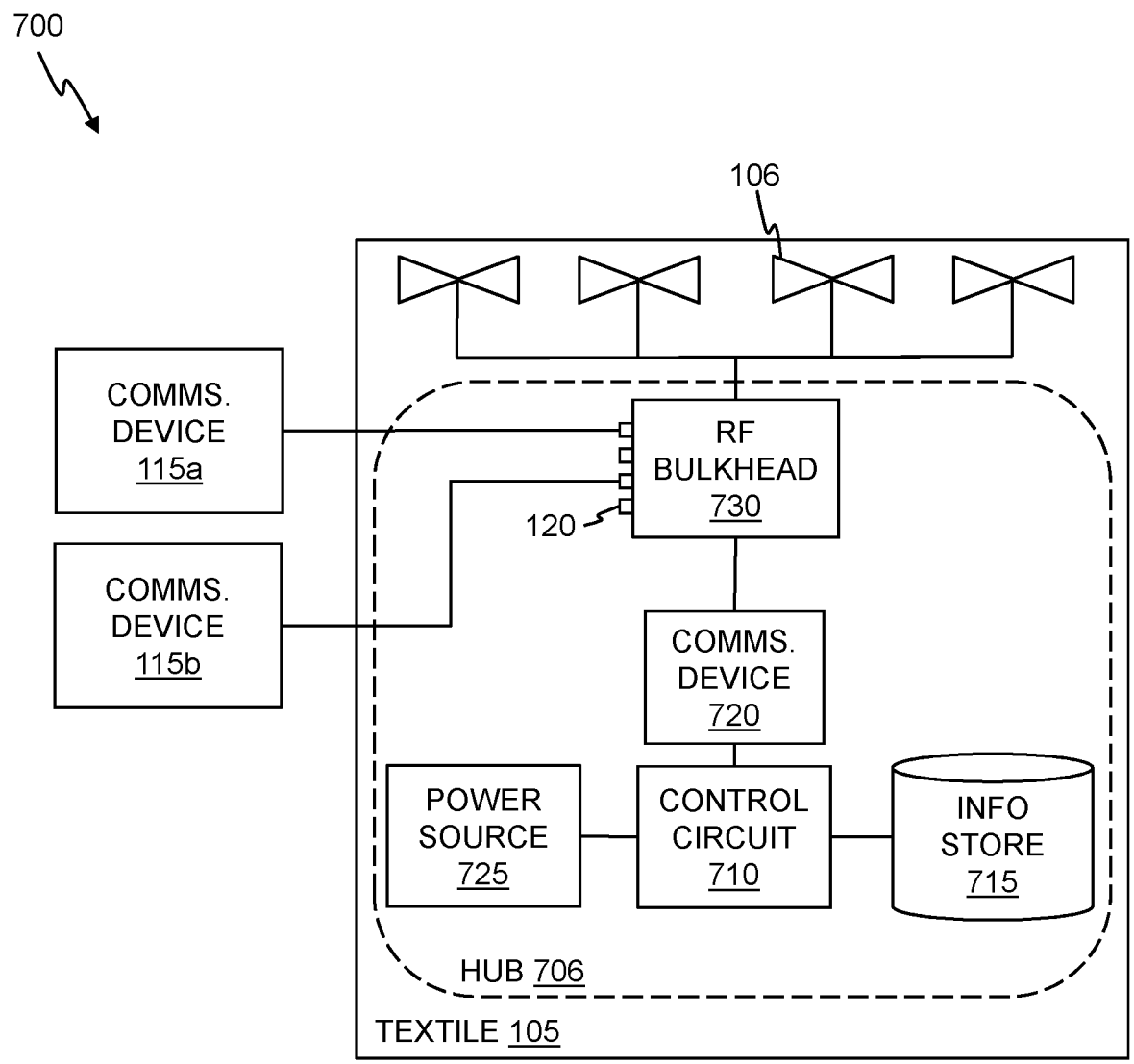
FIG. 7 depicts a block diagram of a communications tarpaulin that is capable of standalone communications, in accordance with certain embodiments.

FIG. 7 depicts a block diagram of the communications tarpaulin 700 that is capable of standalone communications, in accordance with certain embodiments. As opposed to the communications tarpaulin 100, which requires the communications device 115 for operation, the communications tarpaulin 700 can communicate with or without the communications device 115. To be sure, the communications tarpaulin 700 shares one or more components and/or features with the communications tarpaulin 100 (e.g., the textile layer 105, the antenna elements 106, and the RF connectors 120).

The communications tarpaulin 700 includes a hub 706 and the antenna elements 106 affixed to the textile layer 105. The hub 706 is an enclosure that includes one or more information stores 715, power sources 725, and communications devices 720 each connected to a control circuit(s) 710. The communications device 720 (which functions similarly to communications device 115) is further communicatively coupled to a RF bulkhead 730, which includes one or more of the RF connectors 120. The control circuit 710 can be configured to perform one or more of the steps, functions, and/or procedures disclosed in the instant application. In certain embodiments, the power source 725 includes one or more electrochemical cells with external connections provided to power a device. In yet still other embodiments, the power source 725 connects to an external power source or supply (e.g., electrical generator, electrical power outlet).

In other embodiments, the power source 725 includes one or more primary cells and/or secondary cells. The information store 715 is an information repository for the storage and/or management of data. The information store 715 can include several interconnected repositories (e.g., parallel systems, distributed databases, self-referential databases, and similar database systems). The communications device 720 is a radio transmitter and/or receiver that can transmit and/or receive radio waves/signals using one or more of the antenna elements 106. The RF bulkhead 730 is conductively coupled to both the communications device 720 and the antenna elements 106.

The RF bulkhead 730 has a similar function compared to the communications hub 110 in that it is the central location to which the communications device(s) 155 are demountably and communicatively coupled via the RF connectors 120 which are conductively coupled to the antenna elements 106. The RF bulkhead 730 is an enclosure that receives the cabling from the antenna elements 106 and includes the RF connectors 120.

Figure 8:
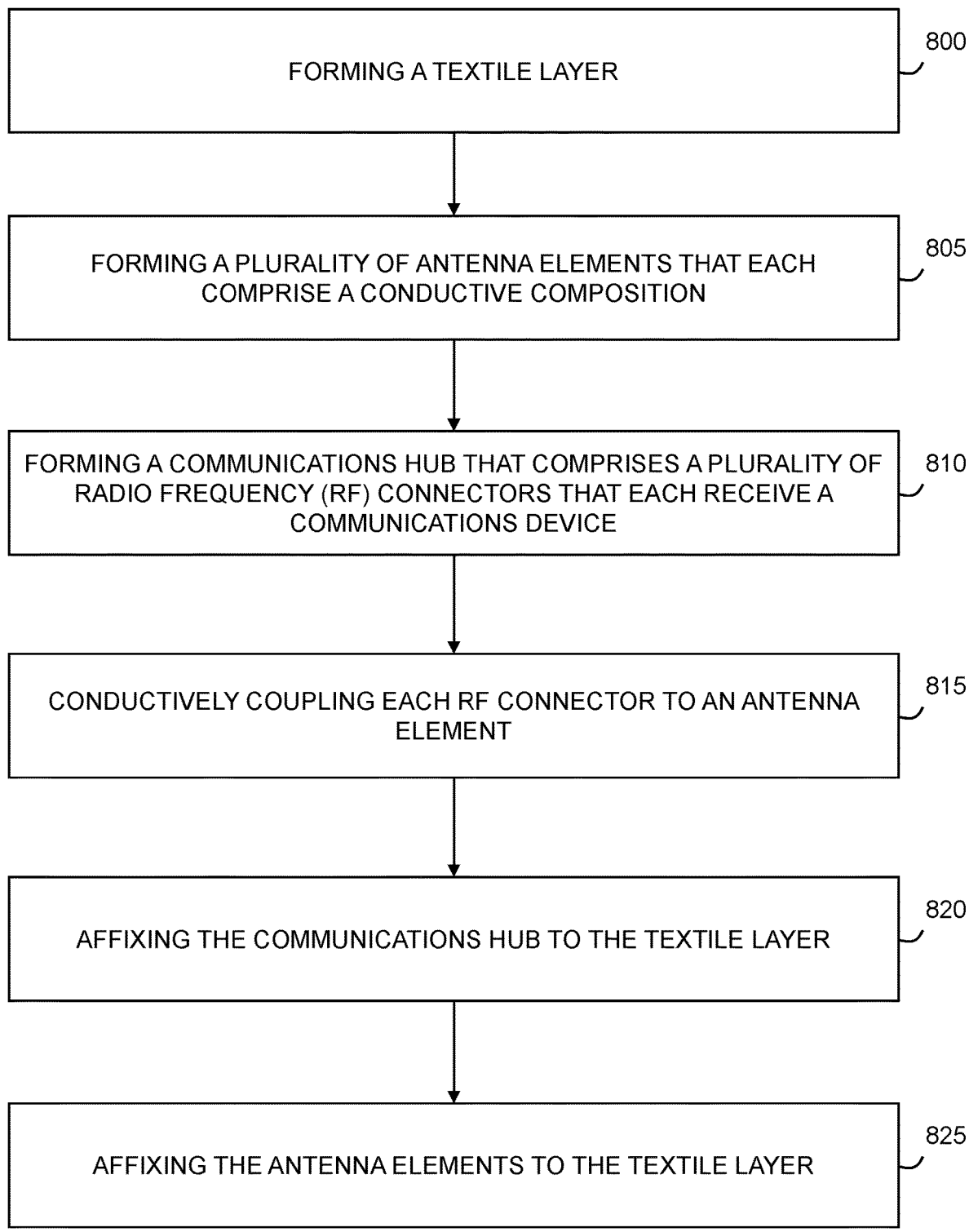
FIG. 8 is a flowchart depicting operational steps of a method for preparing a communications tarpaulin, in accordance with yet still other embodiments.

FIG. 8 is a flowchart depicting operational steps of a method for preparing a communications tarpaulin, in accordance with yet still other embodiments. To begin, a textile layer 105 is formed (Step 800). For example, Step 800 can include: forming a first textile layer 505 that comprises an external surface 510 and an internal surface 515; and forming a second textile layer 520 that is coterminous with the first textile layer 505. Here, forming the communications hub 110 includes; forming a front plate 545; forming a back plate 540; affixing the front plate 545 to the external surface 510; affixing the back plate 540 to the internal surface 515.

Furthermore, forming the textile layer 105 further can include affixing the first textile layer 505 and the second textile layer 520 together to thereby form a multilayered structure 500, the internal surface 515 and the back plate 540 are both positioned within the multilayered structure 500. In other embodiments, Step 800 includes forming the textile layer 105 to include an EMI shielding layer (e.g., EMI shielding layer 535), the EMI shielding layer includes a conductive coating, a conductive mesh, a conductive fabric, a conductive film, or a combination of two or more thereof.

In certain embodiments, Step 800 includes forming a first textile layer 505 that includes an external surface (e.g., the first external surface 510) and an internal surface (e.g., the first internal surface 515; and forming a second textile layer 520 that is coterminous with the first textile layer 505.

A plurality of antenna elements 106 that each include a conductive composition are formed (Step 805). For example, Step 805 can include preparing a conductive composition that comprises a polymer and fully exfoliated single sheets of graphene that are present as a three-dimensional percolated network within the polymer and forming each of the antenna elements 106 using the conductive composition. Alternatively, Step 805 can include applying the conductive composition to a substrate 405 that is conductive or non-conductive; and affixing the substrate to the textile layer 105. A communications hub 110 that includes a plurality of RF connectors 120 that each receive a communications device 115 is formed (Step 810).

Step 810 can include forming a front plate 545; forming a back plate 540; affixing the front plate 545 to the external surface (e.g., the first external surface 510); and affixing the back plate 540 to the internal surface (e.g., first internal surface 515). Here, Step 800 would also include affixing the first textile layer 505 and the second textile layer 520 together to thereby form a multilayered structure 500, the internal surface and the back plate 540 are both positioned within the multilayered structure 500.

For example Step 810 can include forming the communications hub 110 to include a control circuit 710 that is conductively coupled to a communications device 720 and a power source 725; and conductively coupling the communications device 720 to at least one of the antenna elements 106. Each RF connector 120 is conductively coupling to an antenna element 106 (Step 815). The communications hub 110 is affixed to the textile layer 105 (Step 820). The antenna elements 106 is affixed to the textile layer 105 (Step 825).

Based on the foregoing, various embodiments been disclosed in accordance with the instant disclosure. However, numerous modifications and substitutions can be made without deviating from the scope of the instant disclosure. Therefore, the instant disclosure has been disclosed by way of example and not limitation.

As various modifications could be made in the constructions and methods herein described and illustrated without departing from the scope of the instant disclosure, it is intended that all matter contained in the foregoing description or shown in the accompanying drawings shall be interpreted as illustrative rather than limiting. Thus the breadth and scope of the instant disclosure should not be limited by any of the above-described exemplary embodiments, but should be defined only in accordance with the following claims appended hereto and their equivalents.

The invention claimed is:

1. A method for preparing a communications tarpaulin, comprising:
   forming a tarpaulin comprising a textile layer, the textile layer comprising a first textile layer and a second textile layer, the first textile layer comprising an external surface and an internal surface, the second layer is coterminous with the first textile layer;
   forming a plurality of antenna elements that each comprise a conductive composition;
   forming a front plate;
   forming a back plate;
   affixing the front plate to the external surface and the back plate to the internal surface to thereby form a communications hub comprising a plurality of radio frequency ("RF") connectors that each receive a communications device, the front plate comprising the RF connectors;
   affixing the first textile layer and the second textile layer together to thereby form a multilayered structure;
   conductively coupling each RF connector to an antenna element;
   affixing the communications hub to the textile layer in a manner that allows the internal surface and the back plate to be positioned within the multilayered structure; and
   affixing the antenna elements to the textile layer.

2. The method for preparing a communications tarpaulin of claim 1, wherein
   forming the plurality of antenna elements comprises:
      preparing a conductive composition that comprises a polymer and fully exfoliated single sheets of graphene that are present as a three-dimensional percolated network within the polymer; and
      forming each of the antenna elements using the conductive composition.

3. The method for preparing a communications tarpaulin of claim 1, wherein
   forming the plurality of antenna elements comprises:
      applying the conductive composition to a substrate that is conductive or non-conductive; and
      affixing the substrate to the textile layer.

4. The method for preparing a communications tarpaulin of claim 1, wherein
   the communications hub comprises a control circuit conductively coupled to a communications device and a power source; and
   the communications device is conductively coupled to at least one of the antenna elements.

5. The method for preparing a communications tarpaulin of claim 1, wherein
   the textile layer comprises an EMI shielding layer; and
   the EMI shielding layer comprises one or more of a conductive coating, a conductive mesh, a conductive fabric, and a conductive film.

* * * * *